Oct. 24, 1950  J. F. ANDREWS  2,526,795
SAFETY RELIEF DIAPHRAGM
Filed Oct. 18, 1946
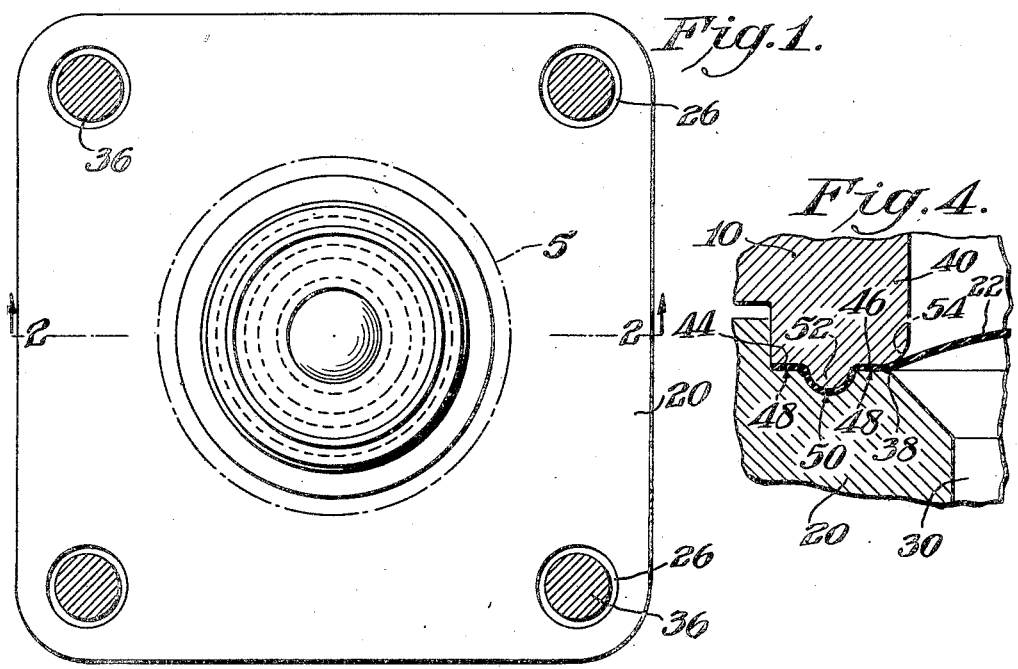
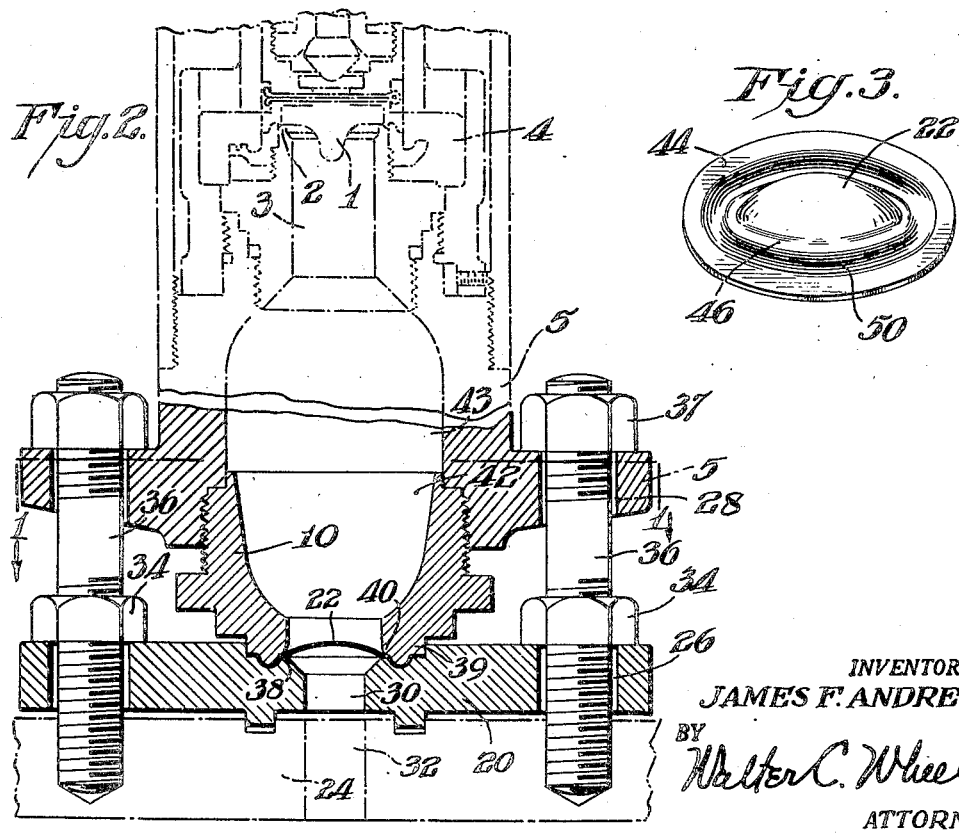
INVENTOR.
JAMES F. ANDREWS
BY Walter C. Wheeler
ATTORNEY Patented Oct. 24, 1950

2,526,795

UNITED STATES PATENT OFFICE 2,526,795

SAFETY RELIEF DIAPHRAGM

James F. Andrews, Penns Grove, N. J., assignor to E. I. du Pont de Nemours & Company, Wilmington, Del., a corporation of Delaware Application October 18, 1946, Serial No. 704,059

3 Claims. (Cl. 220—89)

This invention relates to safety relief devices of the kind which comprise a member that is rupturable when it is subjected to undesired high pressures of gas, and especially to an improved interconnector or adapter suitable for mounting such a rupturable element in combination with a pressure-closed seated valve.

Safety relief valves of the general type are known. One common use of such valves is in connection with tank cars for transporting somewhat volatile liquids which readily generate gas pressures, sometimes becoming dangerous, upon being agitated or upon rises in temperature, such as gasoline, benzene, liquefied gases or liquid acids. The common type of such valve referred to comprises the combination of a breaker pin which is arranged to be elongated to the breaking point by the distortion of a yieldable disc composed of a relatively easily rupturable material such as a lead disc. The disc is restrained from distorting or rupturing by the restraining force of the unruptured breaker pin which is connected to a contact element which is brought to bear on the disc. The arrangement is constructed so that a gas pressure sufficient to distort the disc and elongate the breaker pin to its rupturing point is more than sufficient to rupture the disc after the restraining force of the breaker pin is removed. This device gives satisfactory dependable operation when used on tank cars carrying liquids which do not corrode and impair the disc. The device is not dependable as a safety device when the disc is exposed to liquids or gases which corrode the disc.

It is among the objects of the present invention to provide less complicated and more dependable presure relief valves than those heretofore provided, especially when used in connection with corrosive gases. Another object of the invention is to provide a novel adapter whereby the foregoing object is attained. Other objects of the invention will be apparent from the following description of the invention which will be made with reference to the drawing constituting a part hereof in which Fig. 1 is a top plan view of the improved safety adapter showing a part in cross section taken along the line 1—1 of Fig. 2, Fig. 2 is a side elevational view of the adapter with parts in cross section taken along the line 2—2 of Fig. 1, the superstructure comprising a pressure valve assembly which is indicated in dot and dash lines, Fig. 3 is a perspective view of a rupturable disc, and Fig. 4 is an enlarged, fragmentary cross sectional view of a portion of the mounting for the rupturable disc, illustrating the union of the elements which clamp the disc.

Referring to Fig. 2, the pressure relief valve assembly has a seating member 1 normally in closed position conforming at its edge to the seat 2 which is formed at the terminus of the tubular member 3. In unseated or open position of the valve, an escape passage for the gas is provided to the atmosphere around the seat and to the opening 4. The seated valve assembly and its depending retaining housing 5 as shown are illustrative of a conventional type of valve which may be used in conjunction with the known breaker pin-rupturable disc combinations of the prior art.

In the novel combination now provided, the above described seated valve, its mounting and housing may be used. In such case, an adapter shell 10 is screwed into the lower end of the flanged housing 5 of the valve assembly in place of the breaker pin-rupturable disc mounting and a receptacle member 20 in which the rupturable disc 22 is mounted, is inserted between the adapter 10 and the vessel 24, such as the tank of a tank car. The receptacle member 20 has four bore holes 26 at its corners which are spaced like the bores 28 in the bracket 5. The receptacle member 20 is clamped onto the vessel 24 with its opening 30 coinciding with the opening 32 in the vessel by means of screwing down the nuts 34 on the bolts 36 which are mounted in the wall of the vessel 24. The bolts 36 are threaded at their upper ends and nuts 37 are screwed down upon the bracket 5 to hold the assembly comprising the seated valve and the novel adapter in place.

The receptacle member 20 may remain in place permanently but the assembly comprising the seated valve and adapter 10 is removable by dismounting the nuts 37 in order to assemble the disc 22 in the receptacle. In assembling the device, the rupturable disc 22 which is accurately pre-formed in the manner shown in Figs. 2 and 3 is placed in the disc receptacle which has cylindrical side walls and a circular bottom or seat member, which are formed to conform accurately to the pre-formed disc and the fitting cylindrical end portion 39 of the adapter. The central opening through the bottom of the receptacle communicates with the opening 32 into the tank.

The opening in the bottom of the receptacle is accurately machined so that its upper margin 38, which is in contact with the lower surface of the disc will have the exact diameter as the lower margin 40 of the opening in the bottom of the adapter. The margin 40 contacts with the upper surface of the disc 22. The opening at the bottom of the disc is preferably formed by beveling so that it opens out with the larger diameter in contact with the disc. This provides a free sloping wall contour below the disc which permits the entire bulging portion of the disc to stand free of any obstruction or contact wall.

The receptacle at the top of the disc opens into a somewhat semi-elliptical portion of the chamber 42 which is formed in the adapter shell 10. This enlargement of the through-passage, together with a similar enlargement 43 in the housing 5, forms a gas expansion chamber which provides for free passage of the gas passing through to the seated valve when the disc 22 is ruptured.

The frangible disc or diaphragm 22 is formed to fit into the receptacle of the member 20. It is provided (Fig. 4) with a plain outer marginal portion 44 and a plain concentric inner marginal section 46 which are pre-formed to rest on the plain surface 48 of the bottom of the receptacle. A concentric intermediate bead (Fig. 4) between the marginal portions 44 and 46 is made to conform to a corresponding channel in the receptacle and to the tongue or bead 52 of the adapter, so that when the diaphragm is seated and tightly clamped, there will be no material stressing of the diaphragm-forming portion of the disc. The diaphragm-forming or concentric portion of the disc 42 inside of the clamped portions is a spherical sector, the depth of which may be varied considerably depending on the space available in the rupture disc enclosure and the rupture characteristic required of the disc. For use with corrosive gases, the rupture disc may be composed of a material or metal which is not deleteriously affected by the gas to be confined, or a plating or coating of metal which is not deleteriously affected by the confined gas may sometimes be provided.

A suitable disc may be made from any metal, pure metals being preferred, although certain alloys may also be employed, for example, platinum, silver, copper, nickel, aluminum, lead, iron, tantalum, etc. To illustrate, platinum would be utilized in contact with certain chemicals such as anhydrous hydrofluoric acid, while silver would be used with such materials as sulfur dioxide or chlorine. It is preferred that these metals be of the highest metallurgical purity obtainable and uniformly annealed to rigid specifications to minimize the likelihood of metallurgical segregations or residual stresses. Certain alloyed metals, such as the nickel-bearing steels, the chromium and chromium-nickel bearing steels, bronzes, and so forth, may likewise be employed providing their characteristics are established with similar or comparable uniformity to that indicated for the pure metals.

When clamped in operative position, the disc 22 is formed so that the central or spherical portion will span the space between the inner clamping surfaces of the receptacle and will be spaced from the rounded shoulder or fillet 54 of the adapter which terminates at a point in the plane surface 48, and which is of equal diameter as the rim 38 contacting with the lower surface of the disc 22 so that the disc will be held when rupturing only by the plane or clamping surfaces whose edges are limited by margins above and below the disc having the diameter of the margin 38. When gas pressure is applied which is sufficient to rupture the disc 22, the disc will be expanded with this arrangement until it is ruptured at a central point of the disc and it will not be cut, torn or ruptured at the margin. A clearance between the fillet 54 and the spherical portion of the disc is provided so that rupture will occur before contact of the fillet and disc occur.

In order to avoid tearing of the disc within the clamped area, the contacting edges of the adapter member and the contacting edges of the receptacle member are rounded or filleted and complementary rounded portions are also formed in the pre-formed disc. With this arrangement, the upper and lower surfaces of the pre-formed disc conform exactly to the contour of the bottom of the receptacle and to the contour of the end of the adapter member. Upon clamping, the only forces tending to distort the disc are not transmitted to the central portion of the disc. The arrangement operates to equalize and distribute the pressure over the entire margin of the disc so that with like conditions, like discs will rupture at a constant pressure.

A plain diaphragm or rupturable disc may be used in the novel device, a preferable form of disc having constant bursting pressure may be provided by clamping a plain circular disc composed of the desired metal, metals or alloy between faces formed like the faces of the receptacle and pressure ring and then impressing fluid pressure on the disc to expand its central area into a spherical segment. In order to obtain discs of the most reliable bursting pressure, the flat discs are distorted at the edges sufficiently to permanently form flat and channelled rings at the periphery corresponding to the complementary contours of the faces of the receptacle bottom and pressure ring. After having given the edge portions of the discs a permanent set of the desired contour, fluid, such as air approaching the desired bursting pressure is impressed on the disc until the central area of the disc is bulged and has taken a permanent set. A pressure equal to 85% to 90% of the bursting strength of the disc is desirable. This causes the free central area of the disc to expand into a segment of a sphere.

Instead of regulating the spherical distortion of the disc directly by means of air pressure, I find that discs having a more uniform bursting strength are obtained by impressing the fluid pressure on the disc until a predetermined distortion of the disc is produced which will be effected by a distorting fluid pressure, say of 85% to 90% of the bursting pressure. For example, in making the rupture discs, the distortion from the plane of the face of the receptacle due to 85% to 90% of the bursting pressure of a disc of given composition is empirically determined. Then in a device having clamping faces like those herein described, a gauge is set the determined distance from the plane of the face of the receptacle. After clamping a flat disc in place, a fluid pressure is impressed in excess of the elastic limit of the metal but less than the bursting strength. This force is impressed until the central portion of the metal disc is bulged outwardly the required distance as indicated by the gauge. Discs of uniform thickness and kind which are formed and standardized in this manner are found to have more uniform bursting characteristics than those which are formed by stamping methods. The bursting strength of discs thus formed will be very close to the intended bursting pressure of the discs and their variation from each other is less than among similar discs formed by turning or stamping.

Pure metals, such as copper, platinum or silver, usually give the most uniform bursting pressures and such metals are preferred for manufacturing discs, but alloys having uniform physical characteristics can be successfully used. Where chemically active gases are confined, a metal is chosen which is non-reactive to the confined gas. The rupture discs are given a thickness depending upon the strength of the metal and the pressure to be confined. Then having determined the correct contour of the receptacle, the pressure ring is formed so that after the metal of the disc is grooved into the channel of the receptacle the face of the pressure ring will be the complement of the contacting face of the disc.

From the foregoing disclosure it will be recognized that the invention is susceptible of modification without departing from the spirit and scope thereof and it is to be understood that the invention is not restricted to the specific illustrations thereof herein set forth.

I claim:

1. An interconnecting means comprising a shell having an upper externally threaded cylindrical face and a through passage formed to communicate at its upper end with a gas passage, said externally threaded portion being formed to threadably mount thereon a housing containing said gas passage and having laterally projecting brackets thereon formed with upper bearing surfaces, a facing on the lower end of the shell at the terminus of said through passage formed to conform to the contour of the upper side of a preformed frangible disc, a receptacle member having marginal upper bearing surfaces and a central opening being located to communicate with the through passage of said shell when the frangible disc is ruptured, said receptacle member being formed with a lower faced portion within which said central opening terminates for mounting the receptacle member on a faced portion surrounding an opening in a vessel, said receptacle member being formed with an upwardly opening receptacle encircling said central opening, said receptacle having an upwardly facing seat which conforms to the contour of the lower face of said preformed frangible disc, tension members adapted to be secured to said faced vessel, bearing members adjustably mounted on each of said tension members for engaging said marginal upper bearing surface of said receptacle member for compressing the facing on the lower surface of the receptacle member onto the faced portion of said vessel, and another bearing member adjustably mounted on each of said tension members independently of said first named bearing members for engaging the upper bearing surfaces of said laterally projecting brackets for compressing the frangible disc in said receptacle between the lower facing of said shell and the upwardly facing seat in said receptacle.

2. A device in accordance with claim 1 in which the through passage in the shell is enlarged to provide an expansion chamber.

3. A device in accordance with claim 1 in which said facing at the lower end of the shell is formed with plain ring-formed inner and outer areas and an intermediately disposed bead, the ring-formed areas and the bead being joined by rounded shoulders, and a rounded shoulder at the inner periphery of said inner plain area, the upwardly facing seat of the receptacle being formed with areas complementary to the lower ring formed areas and the beaded area of the frangible disc, said frangible disc having an upper surface which conforms to the corresponding ring formed, beaded and adjoining rounded shoulders of said lower end of the shell.

JAMES F. ANDREWS.

REFERENCES CITED

The following references are of record in the file of this patent:

UNITED STATES PATENTS

| Number | Name | Date |
| --- | --- | --- |
| 1,446,585 | Riotte | Feb. 27, 1923 |
| 1,951,926 | Davidson | Mar. 20, 1934 |
| 2,387,353 | Raymond | Oct. 23, 1935 |

FOREIGN PATENTS

| Number | Country | Date |
| --- | --- | --- |
| 768,817 | France | of 1934 |